(12) United States Patent
Malisetti et al.

(10) Patent No.: US 9,081,679 B2
(45) Date of Patent: Jul. 14, 2015

(54) FEATURE CENTRIC DIAGNOSTICS FOR DISTRIBUTED COMPUTER SYSTEMS

(71) Applicant: CA, Inc., Islandia, NY (US)

(72) Inventors: Ramanjaneyulu Malisetti, Hyderabad (IN); Venkata Ramana Koneti, Hyderabad (IN); Nagamohan Koganti, Hyderabad (IN)

(73) Assignee: CA, Inc., New York, NY (US)

( * ) Notice: Subject to any disclaimer, the term of this patent is extended or adjusted under 35 U.S.C. 154(b) by 161 days.

(21) Appl. No.: 13/752,071

(22) Filed: Jan. 28, 2013

(65) Prior Publication Data

US 2014/0215256 A1 Jul. 31, 2014

(51) Int. Cl.
G06F 11/07 (2006.01)

(52) U.S. Cl.
CPC ............................... G06F 11/0793 (2013.01)

(58) Field of Classification Search
CPC ............ G06F 11/0793; G06F 11/0709; G06F 11/079; G06F 11/0766; G06F 11/0751; G06F 11/0724; G06F 11/0772; G06F 11/0778; G06F 11/07; G06F 11/0781
See application file for complete search history.

(56) References Cited

U.S. PATENT DOCUMENTS

| 4,803,683 | A  | * | 2/1989 | Mori et al. ........................ 714/31 |
| 5,123,017 | A  | * | 6/1992 | Simpkins et al. ................ 714/26 |
| 7,418,630 | B1 | * | 8/2008 | Vick et al. ......................... 714/34 |
| 8,812,916 | B2 | * | 8/2014 | Abdul et al. ..................... 714/48 |
| 2003/0056199 | A1 | * | 3/2003 | Li et al. ........................... 717/127 |
| 2008/0168425 | A1 | * | 7/2008 | Sen et al. ........................ 717/124 |
| 2011/0145656 | A1 | * | 6/2011 | Baitinger et al. ............... 714/45 |

* cited by examiner

*Primary Examiner* — Nadeem Iqbal
(74) *Attorney, Agent, or Firm* — Schwegman Lundberg & Woessner, P.A.

(57) ABSTRACT

A distributed computer system includes components. The components include embedded computer processors that make up an application within the distributed computer system. The computer processors are accessible by an end user of the system. The computer processors are operable to communicate with a plurality of system analyzers, to generate an operational status of the application in the system based on the communication with the plurality of system analyzers, to generate one or more recommendations to address or troubleshoot a non-desired operational status of the application within the system, and to provide a unified interface to the end user that provides to the end user the one or more recommendations to address or troubleshoot the non-desired operational status of the application within the system.

20 Claims, 5 Drawing Sheets

FEATURE CENTRIC DIAGNOSTICS FOR DISTRIBUTED COMPUTER SYSTEMS

TECHNICAL FIELD

The current disclosure relates to distributed computer systems, and in an embodiment, but not by way of limitation, a feature centric diagnostic system for distributed computer systems.

BACKGROUND

Distributed computer systems can be composed of multiple products and technologies, and as the name indicates, are distributed in nature. Analyzing failures in distributed and composed applications is a challenging task since the failures may come from a single component or multiple components, and/or may be due to a coordination mismatch among the components. Each component or product in a distributed computer system may have its own mechanism for troubleshooting problems and failures of that particular component or product. For example, many systems have a built-in mechanism to write errors or failures to log files, and applications exist that gather log files from multiple components into a single place for easier review and troubleshooting of failures.

Identifying a root cause of a non-trivial failure in a distributed computer system may take many exchanges of information and analysis between customer and system support teams, since in such scenarios log files may not be sufficient to diagnose the failures. In order to understand the failures, support people may start gathering more information about application configurations, runtime configurations, and sometimes infrastructure configurations. Finally, as noted above, the reasons for failures could vary from missing or inappropriate configurations, conflicts in the environment, or the unavailability of dependencies. While the root cause of a failure may eventually turn out to be trivial and relatively easy to remedy, the time and effort that was needed to identify the root cause may have been substantial, and the reputation of a software provider may be damaged by the failures and the time and resources that it took to remedy such failures.

SUMMARY

In an embodiment, a distributed computer system includes a plurality of components. Each of the components includes an embedded computer processor, and the plurality of components make up an application within the distributed computer system.

The computer processors embedded in each of the components within the distributed computer system are operable to execute several diagnostic functions with respect to the features of the distributed system. The processors are accessible by an end user of the distributed computer system. The processors are operable to communicate with a plurality of system analyzers, and are operable to generate an operational status of the application in the distributed computer system based on the communication with the plurality of system analyzers. The processors are further operable to generate one or more recommendations to address or troubleshoot a non-desired operational status of the application within the distributed computer system, and to provide a unified interface to the end user that provides to the end user the one or more recommendations to address or troubleshoot the non-desired operational status of the application within the distributed computer system.

DETAILED DESCRIPTION

Figure 1:
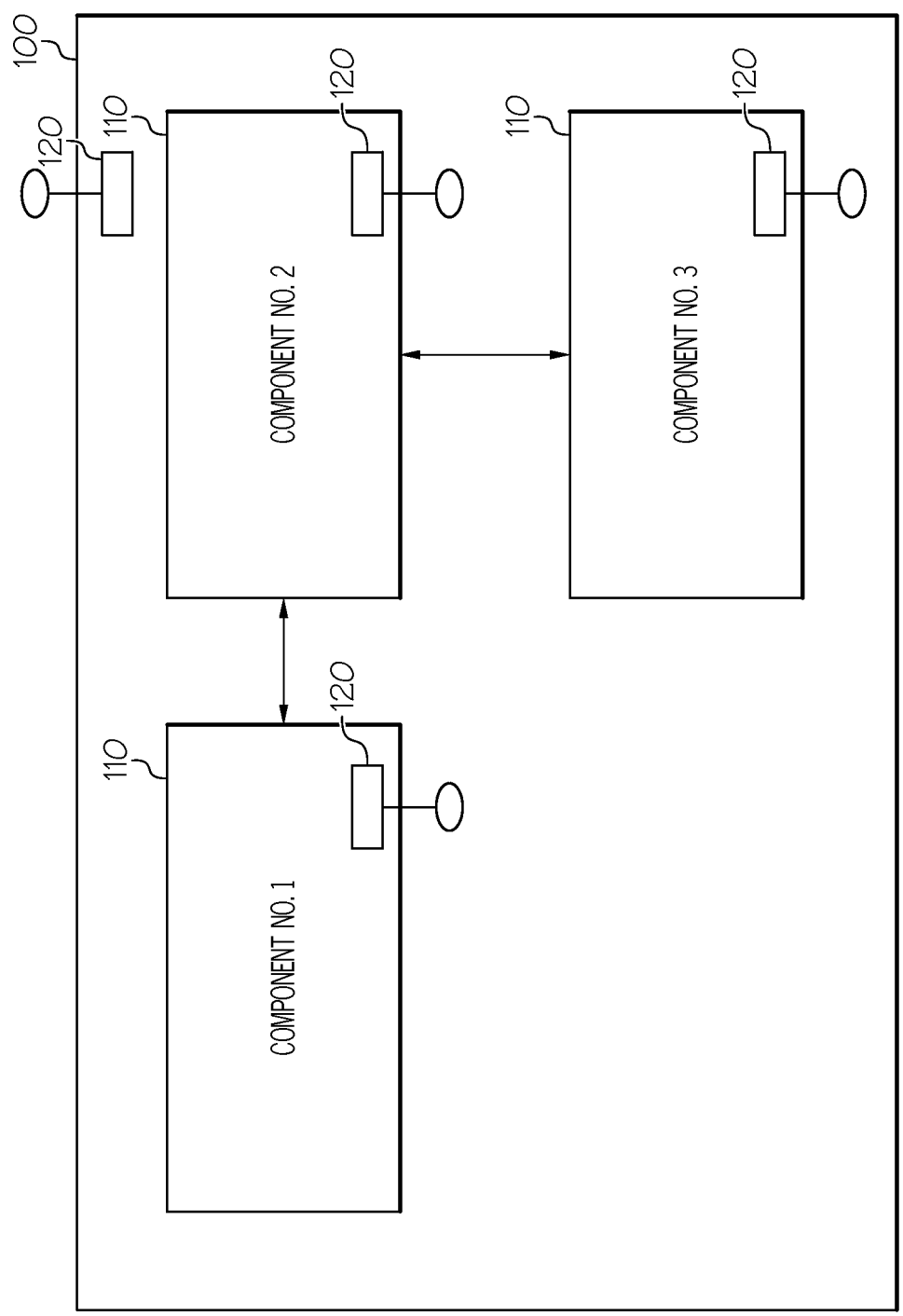
FIG. 1 is a block diagram of an example of a composite application.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

In a distributed computer system, once the root cause of a failure is analyzed, sometimes identifying what fix needs to be applied to restore the system to a normal or desired state involves taking subject matter experts' suggestions or searching a knowledgebase. An embodiment of the present disclosure relates to embedding a diagnostic service in a distributed computer system that is capable of analyzing error/failure logs, runtime logs, component dependencies, and application/system/infrastructure configurations to provide an operational status and possible remediation (e.g., by consulting a knowledgebase) if the operations are running in a non-desired state.

An embodiment involves seamlessly providing a troubleshooting mechanism from the software system (i.e., the distributed computer system or an application in the distributed computer system) itself to simplify identifying failures and root causes, and providing possible remediation plans that are easy to use, understand, and access by the end user of the system with respect to features of the system. Consequently, end users will have a hassle free experience dealing with failures of a system due to multiple reasons and an independent software vendor's (ISV) support time will be minimized.

FIG. 1 illustrates a typical structure 100 of a distributed application with different components 110. The components 110 may be executing on different systems that are loosely coupled together such that the components 110 collectively provide a solution or composite application. The distributed application 100 includes a diagnostic service 120 embedded or co-located within each component as well as at the distributed/composite application level. The diagnostic services 120 are accessible to end users via a ubiquitous client-like Internet browser or via system level access such as an application program interface (API). The diagnostic services 120 can be a plug-in that provides a single point of access, and this single point of access can federate user communication with the components 110 in the diagnostic process. As a result, the diagnostic services 120 implement a unified interface and advertise scenarios they can offer for troubleshooting system failures. In an embodiment, a unified interface means an interface from which a user receives information regarding all of the components of an application in a distributed system. Generally, the end user access diagnostic service 120 is at an application level and invokes a diagnostic service at a component level to trace a failure close to the point of origin.

Figure 2:
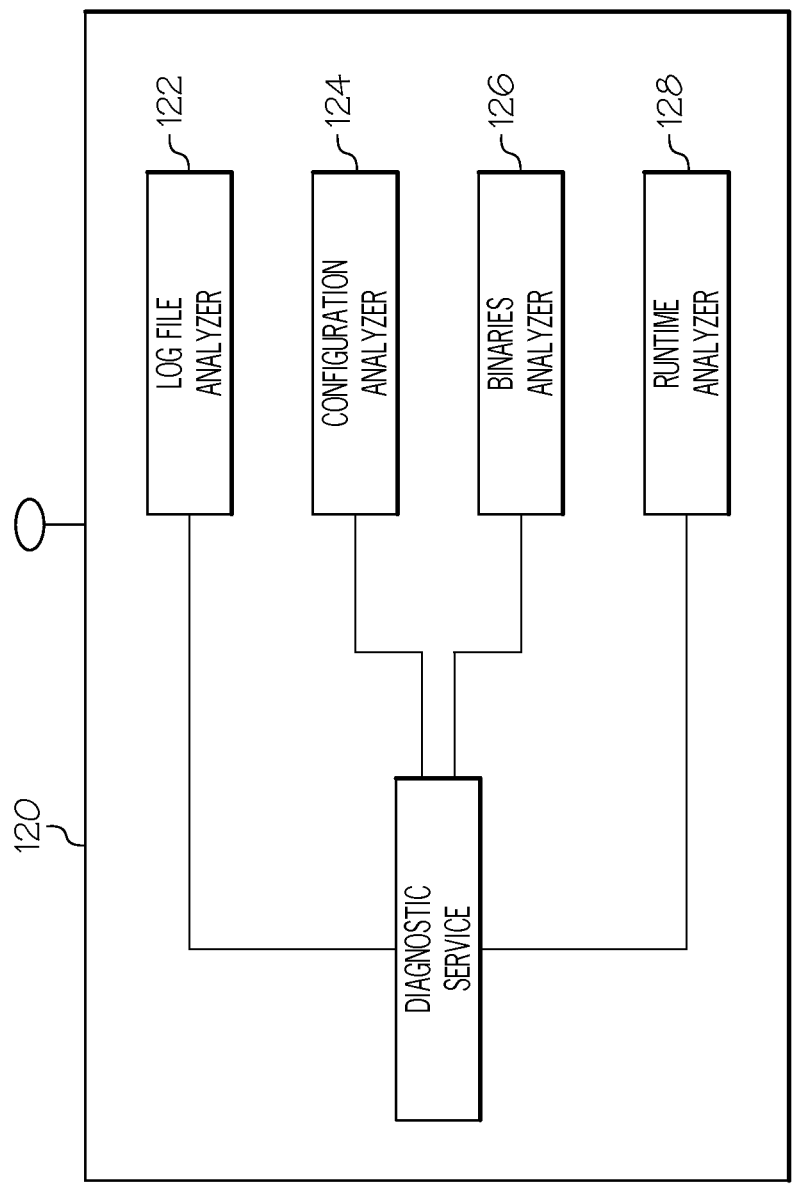
FIG. 2 is a block diagram of an example of a diagnostic application for a distributed computer system.

FIG. 2 illustrates details of the diagnostic service 120. The diagnostic service 120 includes hooks to analyze failures in the distributed system by communicating with a log file analyzer 122, a configuration analyzer 124, a binaries analyzer 126, and a runtime analyzer 128. The analyzers 122-128 are just examples, and other types of analyzers could also be included. The diagnostic service 120 searches for clues by communicating with these analyzers, and identifying any non-desired situations in the distributed system 100. Upon identifying a non-desired situation, the diagnostic service 120 can review a database (such as a knowledgebase of expert suggestions are referred to above) to see if there are one or more solutions to the non-desired situation, and then report to the end user the non-desired situation and the proposed solutions.

For example, if an application in a distributed system crashes, the diagnostic services 120 may first communicate with the log file analyzer 122. The log file analyzer may see in one of the error logs that a particular component ceased execution at a certain time. The log files analyzer 122 may further determine from the log file that a data record from a particular file did not have the expected data format. At this point, the diagnostic services may communicate with the configuration analyzer 124, and the configuration analyzer may verify that the particular component was expecting one format, but the record from the data file was in another format. At this point, the diagnostic services 120 could recommend to the end user that the record format be changed, or that the configuration of the component be changed. Additionally, the diagnostic services 120 could check a system upgrade file, determine that the change to the record format of the database was required, and recommend to the end user that the preferred course of action is to change the configuration of the component. Depending on the structure and privileges of the system, an end user may have the authority to take care of such a situation, or the end user could notify the independent software vendor.

Similarly, for each supported scenario of troubleshooting, diagnostic services 120 can be configured with several features. The diagnostic services can examine a log file and determine if a log entry corresponds to a successful or unsuccessful scenario. If an entry indicates an unsuccessful scenario, then the diagnostic services 120 can further investigate the situation. The diagnostic services 120 can also determine, for example by communicating with the configuration analyzer 124 and the runtime analyzer 128, the proper runtime application configuration and the proper application configuration for a particular scenario in the distributed system 100. The diagnostic services 120 can also determine potential conflicts from common frameworks like Extensible Markup Language (XML) parsers or encryption libraries. The diagnostic services 120 can further communicate with the runtime analyzer 128 to check on infrastructure and to determine if the distributed system is running in conformance with the intended runtime. If the system or an application is not executing as expected (either not at the correct time, or taking too long or too little time to execute), the diagnostic services 120 can investigate further. Additionally, the diagnostic services 120 can communicate with one, then another, and then another component in a chainlike manner to investigate a non-desired situation throughout the distributed system, and locate a cause of a failure at the source of the failure.

Dealing with most non-trivial issues in distributed software systems involves many requests to a customer for getting log files, memory dumps, thread dumps, and configurations. This is then followed by having support bridge sessions. Moreover, all of these activities may not happen in single stretch, but continue over a period of time as support teams come to understand the issues involved with the failure. An embodiment is a flexible solution in that it can determine what are successful results, what are failures in a system, and the embodiment can be configured with multiple such scenarios. Consequently, in the embodiment, troubleshooting a supported scenario is as straightforward as invoking a service.

Additionally, an embodiment frees up system support teams and/or development teams from spending time on dealing with sustenance work. If the diagnostic service 120 can guide an end user to an appropriate resolution of a failure, then the system support teams and development teams can focus more on delivering new products and new features rather than responding to system failures.

Figure 3:
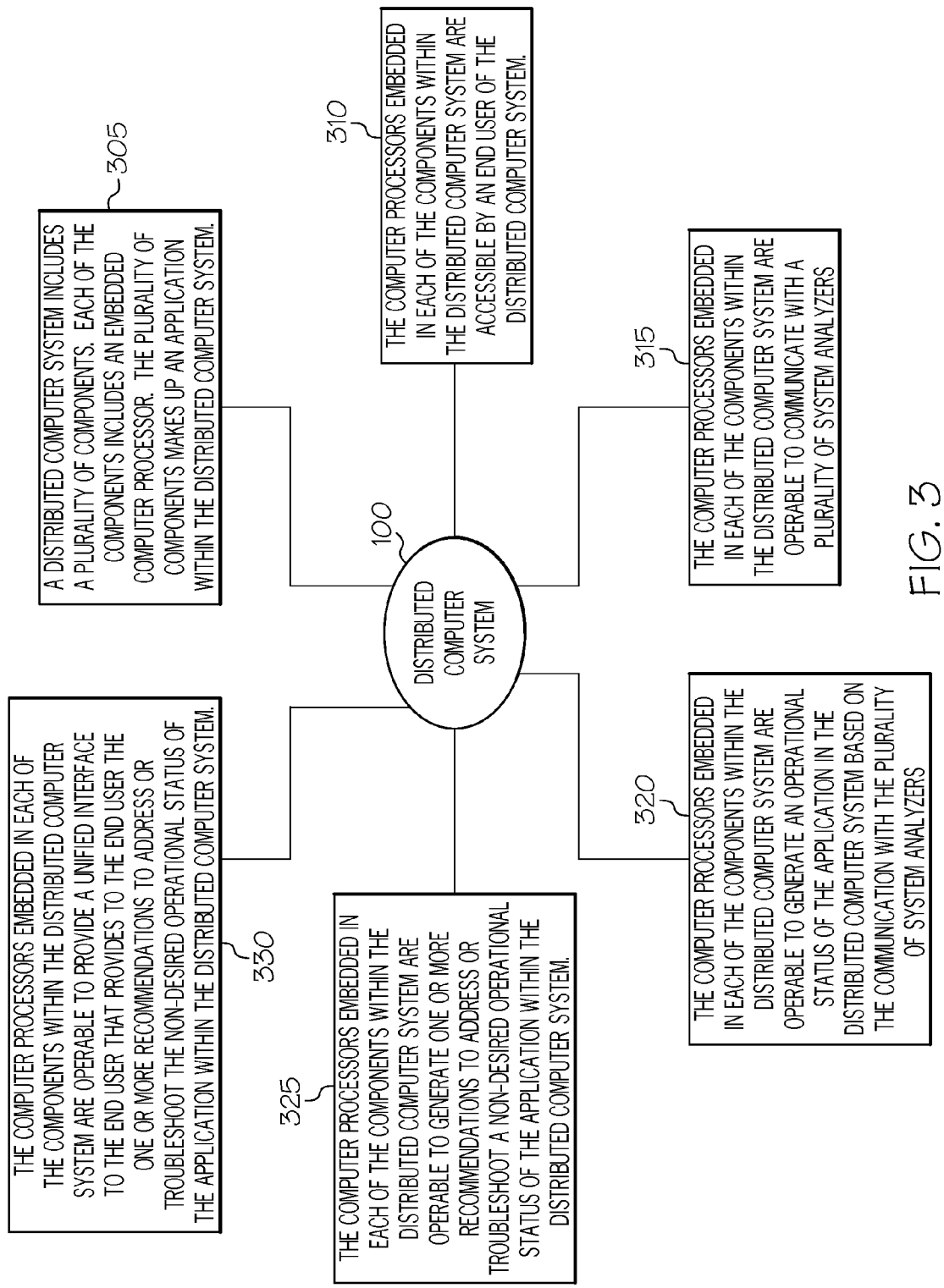
FIG. 3 is a diagram illustrating a first set of features of a distributed computer system.
Figure 4:
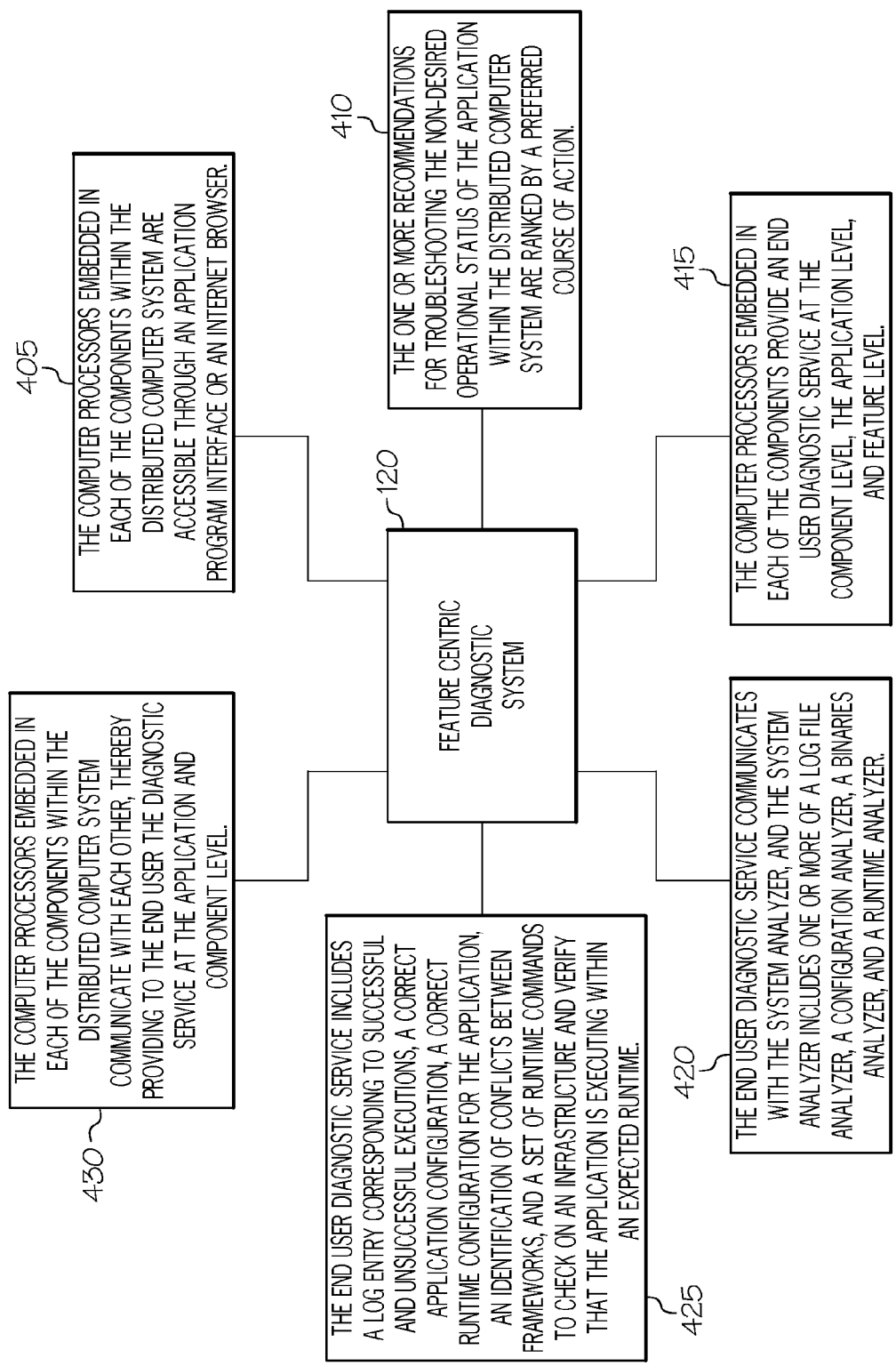
FIG. 4 is a diagram illustrating a second set of features of an end user diagnostic system for a distributed computer system.

FIG. 3 is a diagram illustrating a first set of features of a distributed computer system 100, and FIG. 4 is a diagram illustrating a set of features of an end user diagnostic system 120 for distributed computer systems.

FIG. 3 illustrates in block 305 that a distributed computer system includes a plurality of components. Each of the components includes an embedded computer processor. The plurality of components makes up an application within the distributed computer system. Block 310 illustrates that the computer processors embedded in each of the components within the distributed computer system are accessible by an end user of the distributed computer system. As previously noted, there are several advantages to providing such access or an interface to an end user, such as freeing up support and development personnel, and providing quicker resolutions of system failures to the end user. As noted in block 315, the computer processors embedded in each of the components within the distributed computer system are operable to communicate with a plurality of system analyzers. As noted previously, the system analyzers examine log files, configuration files, binaries files, and runtime files to analyze and seek out the causes of system failures. Block 320 indicates that the computer processors embedded in each of the components within the distributed computer system are operable to generate an operational status of the application in the distributed computer system based on the communication with the plurality of system analyzers (using the system analyzers' access to log files, configuration files, binary files, and runtime files). Block 325 illustrates that the computer processors embedded in each of the components within the distributed computer system are operable to generate one or more recommendations to address or troubleshoot a non-desired operational status of the application within the distributed computer system. For example, if configuration file system analyzer determines that an improper configuration is in place (because for example a configuration file has not been updated or an out of date version was incorrectly installed), a recommendation could be to upgrade the configuration file. Block 330 illustrates that the computer processors embedded in each of the components within the distributed computer system are operable to provide a unified interface to the end user that provides to the end user the one or more recommendations to address or troubleshoot the non-desired operational status of the application within the distributed computer system. As previously noted, this feature permits an end user to have a greater involvement in remedying failures on the end user's system, thereby freeing up support and development personnel and resulting in quicker solutions. The unified interface also provides to the end user a single point of information regarding the many components of a distributed computer system.

FIG. 4 illustrates at 405 a feature wherein the computer processors embedded in each of the components within the distributed computer system comprise an application program interface or an Internet browser. This feature provides the end user with a user friendly interface. At 410, the one or more recommendations for troubleshooting the non-desired operational status of the application within the distributed computer system are ranked by a preferred course of action. For example, if a non-desired operation of a slow runtime for an application is detected, and a recommendation is made to pare down the size of the input or to run the process in parallel, the option to run the application in parallel may be preferred and therefore ranked higher because paring down data would result in incomplete results. At 415, the computer processors embedded in each of the components provide an end user diagnostic service at the component level and the application level. This access to application and component levels permits tracing of the non-desired operational status of the application within the distributed computer system close to the origin of the cause of the non-desired operational status, thereby honing in on the root cause of the system failure. Additionally, it permits the end user to execute such tracing, thereby leading to a more direct and faster solution to the failure.

At 420, the end user diagnostic service communicates with the system analyzer, and the system analyzer comprises one or more of a log file analyzer, a configuration analyzer, a binaries analyzer, and a runtime analyzer. At 425, the end user diagnostic service includes a log entry corresponding to successful and unsuccessful executions, a correct application configuration, a correct runtime configuration for the application, an identification of conflicts between frameworks, and a set of runtime commands to check on an infrastructure and verify that the application is executing within an expected runtime.

At 430, the computer processors embedded in each of the components within the distributed computer system communicate with each other, thereby providing to the end user the diagnostic service at the application and component level.

Figure 5:
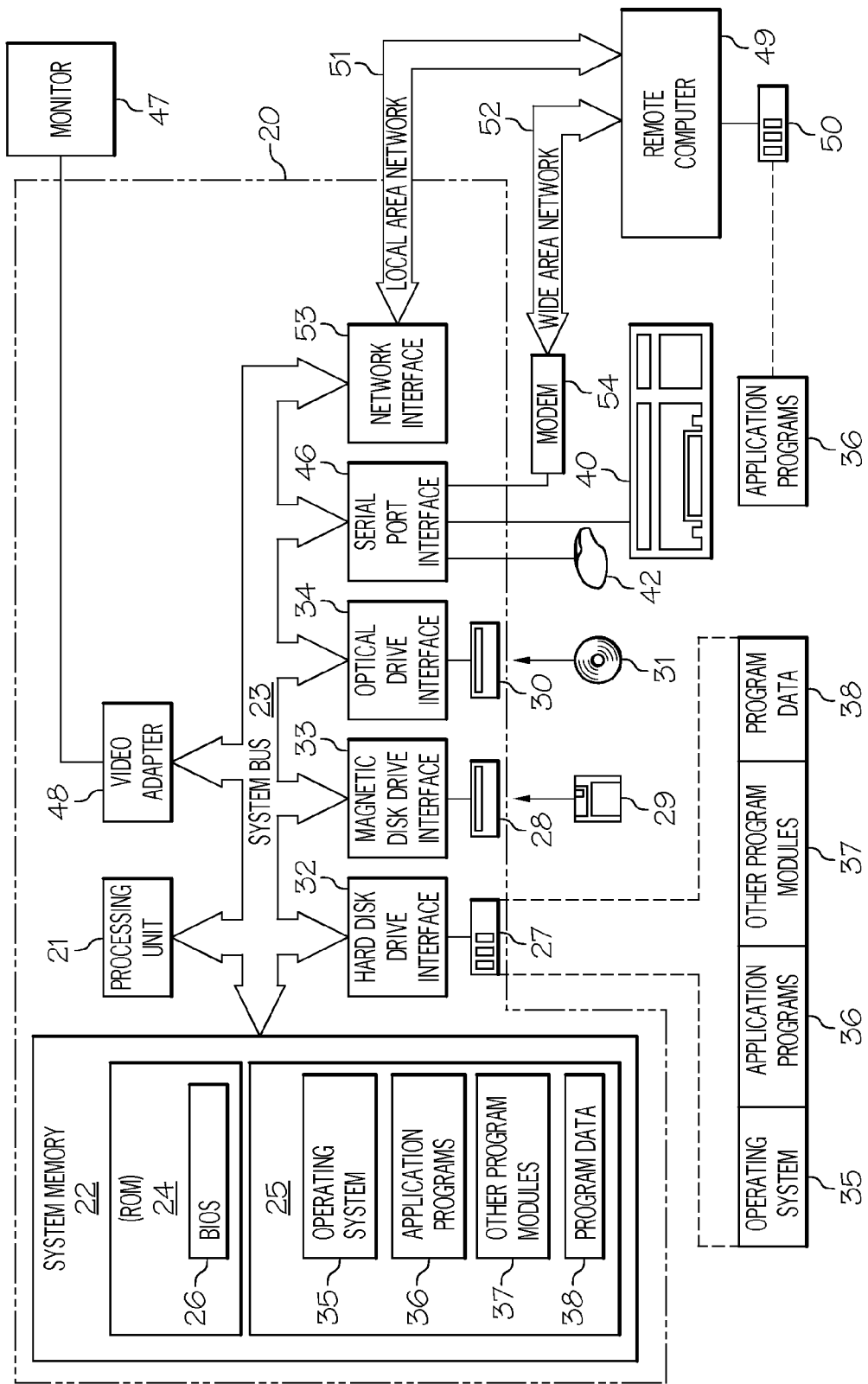
FIG. 5 is a block diagram illustrating an example of computer hardware upon which one or more of the embodiments of the present disclosure can execute.

FIG. 5 is an overview diagram of hardware and an operating environment in conjunction with which embodiments of the invention may be practiced. The description of FIG. 5 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 5, a hardware and operating environment is provided that is applicable to any of the servers and/or remote clients shown in the other Figures.

As shown in FIG. 5, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 47 can display a graphical user interface for the user. In addition to the monitor 47, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/O relative to the computer 20, although only a memory storage device 50 has been illustrated. The logical connections depicted in FIG. 5 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

What is claimed is:

1. A distributed computer system comprising:
    a plurality of components, each of the components comprising an embedded computer processor, the plurality of components comprising a distributed application within the distributed computer system;
    wherein the computer processors embedded in each of the components within the distributed computer system are accessible by an end user of the distributed computer system;
    wherein the computer processors embedded in each of the components within the distributed computer system are operable to communicate with a plurality of system analyzers;
    wherein the computer processors embedded in each of the components within the distributed computer system are operable to generate an operational status of the distributed application in the distributed computer system based on the communication with the plurality of system analyzers;
    wherein the computer processors embedded in each of the components within the distributed computer system are operable to generate one or more recommendations to address or troubleshoot a non-desired operational status of the distributed application within the distributed computer system; and
    wherein the computer processors embedded in each of the components within the distributed computer system are operable to provide a unified interface to the end user that provides to the end user the one or more recommendations to address or troubleshoot the non-desired operational status of the distributed application within the distributed computer system.

2. The distributed computer system of claim 1, wherein the computer processors embedded in each of the components within the distributed computer system are accessible through an application program interface or an Internet browser.

3. The distributed computer system of claim 1, wherein the one or more recommendations for troubleshooting the non-desired operational status of the distributed application within the distributed computer system are ranked according to a preferred course of action.

4. The distributed computer system of claim 1, wherein the computer processors embedded in each of the components provide an end user diagnostic service at the component level, the distributed application level, and feature level, thereby permitting tracing of the non-desired operational status of the application within the distributed computer system close to an origin of a cause of the non-desired operational status, and further permitting the tracing by the end user.

5. The distributed computer system of claim 4, wherein the end user diagnostic service communicates with the system analyzer, and the system analyzer comprises one or more of a log file analyzer, a configuration analyzer, a binaries analyzer, and a runtime analyzer.

6. The distributed computer system of claim 5, wherein the end user diagnostic service comprises:
    a log entry corresponding to a successful or an unsuccessful execution;
    a correct distributed application configuration;
    a correct runtime configuration for the distributed application;
    an identification of a conflict between frameworks; and
    a set of runtime commands to check on an infrastructure and verify that the application is executing within an expected runtime.

7. The system of claim 4, wherein the computer processors embedded in each of the components within the distributed computer system communicate with each other, thereby providing the unified end user diagnostic service.

8. A process comprising:
in a distributed computer system, the distributed computer system comprising a plurality of components, each of the components comprising an embedded computer processor, the plurality of components comprising a distributed application within the distributed computer system;
wherein an end user of the distributed computer system has access to each of the computer processors embedded in each of the components within the distributed computer system;
communicating between the computer processors embedded in each of the components within the distributed computer system and a plurality of system analyzers;
generating an operational status of the distributed application in the distributed computer system based on the communication between the computer processors embedded in each of the components within the distributed computer system and the plurality of system analyzers;
generating one or more recommendations to address or troubleshoot a non-desired operational status of the distributed application within the distributed computer system; and
transmitting to the end user via an end user unified interface one or more recommendations to address or troubleshoot the non-desired operational status of the application within the distributed computer system.

9. The process of claim 8, wherein the computer processors embedded in each of the components within the distributed computer system comprise an application program interface or an Internet browser.

10. The process of claim 8, comprising ranking by a preferred course of action the one or more recommendations for troubleshooting the non-desired operational status of the distributed application within the distributed computer system.

11. The process of claim 8, comprising providing an end user diagnostic service at the component level, the distributed application level, and feature level, thereby permitting tracing of the non-desired operational status of the application within the distributed computer system to identify a cause of the non-desired operational status close to the origin of the non-desired operational status, and further permitting the tracing by the end user.

12. The process of claim 11, comprising communicating between the end user diagnostic service and the system analyzer, wherein the system analyzer comprises one or more of a log file analyzer, a configuration analyzer, a binaries analyzer, and a runtime analyzer.

13. The process of claim 12, wherein the end user diagnostic service comprises:
a log entry corresponding to a successful or unsuccessful execution;
a correct distributed application configuration;
a correct runtime configuration for the distributed application;
an identification of a conflict between frameworks; and
a set of runtime commands to check on an infrastructure and verify that the application is executing within an expected runtime.

14. The system of claim 11, wherein the computer processors embedded in each of the components within the distributed computer system communicate with each other, thereby providing the end user diagnostic service.

15. A computer readable storage device comprising instructions that when executed by a processor execute a process comprising:
in a distributed computer system, the distributed computer system comprising a plurality of components, each of the components comprising an embedded computer processor, the plurality of components comprising a distributed application within the distributed computer system;
wherein an end user of the distributed computer system has access to each of the computer processors embedded in each of the components within the distributed computer system;
communicating between the computer processors embedded in each of the components within the distributed computer system and a plurality of system analyzers;
generating an operational status of the distributed application in the distributed computer system based on the communication between the computer processors embedded in each of the components within the distributed computer system and the plurality of system analyzers;
generating one or more recommendations to address or troubleshoot a non-desired operational status of the distributed application within the distributed computer system; and
transmitting to the end user via an end user unified interface one or more recommendations to address or troubleshoot the non-desired operational status of the distributed application within the distributed computer system.

16. The computer readable storage device of claim 15, wherein the computer processors embedded in each of the components within the distributed computer system comprise an application program interface or an Internet browser.

17. The computer readable storage device of claim 15, comprising instructions for ranking by a preferred course of action the one or more recommendations for troubleshooting the non-desired operational status of the distributed application within the distributed computer system.

18. The computer readable storage device of claim 15, comprising instructions for providing an end user diagnostic service at the component level, the distributed application level, and feature level, thereby permitting tracing of the non-desired operational status of the distributed application within the distributed computer system to identify a cause of the non-desired operational status close to the origin of the non-desired operational status, and further permitting the tracing by the end user.

19. The computer readable storage device of claim 18, comprising instructions for communicating between the end user diagnostic service and the system analyzer, wherein the system analyzer comprises one or more of a log file analyzer, a configuration analyzer, a binaries analyzer, and a runtime analyzer, and wherein the end user diagnostic service comprises:
a log entry corresponding to a successful or unsuccessful execution;
a correct distributed application configuration;
a correct runtime configuration for the distributed application;
an identification of a conflict between frameworks; and
a set of runtime commands to check on an infrastructure and verify that the application is executing within an expected runtime.

20. The computer readable storage device of claim 18, wherein the computer processors embedded in each of the components within the distributed computer system communicate with each other, thereby providing the end user diagnostic service.

* * * * *